(12) United States Patent
Takahashi et al.

(10) Patent No.: US 9,937,854 B2
(45) Date of Patent: Apr. 10, 2018

(54) ILLUMINATED DOOR HANDLE

(71) Applicants: KOITO MANUFACTURING CO., LTD., Tokyo (JP); AISIN SEIKI KABUSHIKI KAISHA, Kariya-shi, Aichi-ken (JP)

(72) Inventors: Haruhito Takahashi, Shizuoka (JP); Shigehiko Kazaoka, Shizuoka (JP); Masashi Tateishi, Nagoya (JP); Masaki Yoshino, Chita-gun (JP); Yoshiki Ishikawa, Toyota (JP)

(73) Assignees: KOITO MANUFACTURING CO., LTD., Minato-ku, Tokyo (JP); AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/036,872

(22) PCT Filed: Nov. 19, 2014

(86) PCT No.: PCT/IB2014/002487
§ 371 (c)(1),
(2) Date: May 16, 2016

(87) PCT Pub. No.: WO2015/075528
PCT Pub. Date: May 28, 2015

(65) Prior Publication Data
US 2016/0297352 A1 Oct. 13, 2016

(30) Foreign Application Priority Data
Nov. 19, 2013 (JP) .................................. 2013-238815

(51) Int. Cl.
*F21V 9/00* (2015.01)
*B60Q 1/26* (2006.01)
(Continued)

(52) U.S. Cl.
CPC ............ *B60Q 1/2669* (2013.01); *E05B 17/10* (2013.01); *E05B 85/10* (2013.01); *E05B 85/16* (2013.01);
(Continued)

(58) Field of Classification Search
CPC . F21V 9/00; F21V 29/00; F21V 11/00; F21V 1/00; B60Q 1/00; B60Q 1/26; B60Q 3/00
(Continued)

(56) References Cited

U.S. PATENT DOCUMENTS

2005/0285717 A1  12/2005  Ieda et al.
2007/0111845 A1*  5/2007  Hayakawa ............. E05B 81/20
                                                  475/317
(Continued)

FOREIGN PATENT DOCUMENTS

CN  1713239 A  12/2005
CN  101646832 A  2/2010
(Continued)

OTHER PUBLICATIONS

Office Action dated Mar. 3, 2017, from the State Intellectual Property Office of People's Republic of China in counterpart Application No. 201480062847.0.

*Primary Examiner* — Edwyn Labaze
(74) *Attorney, Agent, or Firm* — Sughrue Mion, PLLC

(57) ABSTRACT

A door handle includes a casing inside which an accommodation space is provided, and a lamp unit disposed in the accommodation space. The lamp unit includes a light emission element, a circuit board on which the light emission element is mounted, and a combination member including a housing and a light guiding lens. The housing supports the circuit board, and the light guiding lens guides light emitted from the light emission element in a predetermined direction. In the door handle, a connection wire that supplies
(Continued)

driving current to at least the light emission element is connected to the circuit board, and a portion of the connection wire is wound around a portion of the combination member.

5 Claims, 10 Drawing Sheets

(51) Int. Cl.
    *E05B 85/10*     (2014.01)
    *E05B 17/10*     (2006.01)
    *F21S 8/10*     (2006.01)
    *E05B 85/16*     (2014.01)
    *E05B 79/06*     (2014.01)

(52) U.S. Cl.
    CPC ........... *F21S 48/212* (2013.01); *F21S 48/215* (2013.01); *F21S 48/225* (2013.01); *F21S 48/2293* (2013.01); *B60Q 2400/40* (2013.01); *E05B 79/06* (2013.01)

(58) Field of Classification Search
    USPC .......................... 362/511, 501, 509, 544, 546
    See application file for complete search history.

(56) References Cited

U.S. PATENT DOCUMENTS

| | | | |
|---|---|---|---|
| 2007/0175743 | A1 | 8/2007 | Nagai et al. |
| 2008/0290668 | A1 | 11/2008 | Ieda et al. |
| 2010/0077805 | A1 | 4/2010 | Mueller et al. |
| 2011/0170305 | A1 | 7/2011 | Tanaka et al. |
| 2012/0170298 | A1* | 7/2012 | Lennhoff ............. B60Q 1/2665 362/521 |
| 2013/0107557 | A1* | 5/2013 | Dingman ............. B60Q 1/2665 362/501 |
| 2013/0130674 | A1* | 5/2013 | De Wind ............. B60Q 1/2619 455/420 |

FOREIGN PATENT DOCUMENTS

| | | |
|---|---|---|
| CN | 101680240 A | 3/2010 |
| JP | 2006-9279 A | 1/2006 |
| JP | 2007-186943 A | 7/2007 |
| JP | 2009-133133 A | 6/2009 |
| JP | 2010-229797 A | 10/2010 |
| JP | 2012-188847 A | 10/2012 |
| WO | 2008/120067 A2 | 10/2008 |

* cited by examiner

ILLUMINATED DOOR HANDLE

CROSS REFERENCE TO RELATED APPLICATIONS

This application is a National Stage of International Application No. PCT/IB2014/002487 filed Nov. 19, 2014, claiming priority based on Japanese Patent Application No. 2013-238815 filed Nov. 19, 2013, the contents of all of which are incorporated herein by reference in their entirety.

BACKGROUND OF THE INVENTION

1. Field of the Invention

The invention relates to a door handle provided with a lamp unit including a circuit board on which a light emission element is mounted.

2. Description of Related Art

In some door handles, a circuit board is supported by a housing, a light emission element that functions as a light source is mounted on the circuit board, and light emitted from the light emission element is radiated in a predetermined direction (for example, see Japanese Patent Application Publication 2010-229797 (JP-A-2010-229797), Japanese Patent Application Publication 2009-133133 (JP-A-2009-133133), and Japanese Patent Application Publication 2006-9279 (JP-A-2006-9279)).

JP-A-2010-229797 and JP-A-2009-133133 describe a light unit provided in a door handle that illuminates an area around the user's feet when a door is opened or closed. By illuminating the area around the user's feet, the user can see whether there is a puddle or the like when the door is opened or closed, and thus the user-friendliness increases.

JP-A-2006-9279 also describes a light unit provided in a door handle. In the light unit described in JP-A-2006-9279, an internal space is defined by a housing (case) and a lid, a circuit board is disposed in the internal space, and the light emission element is mounted on the circuit board. A connection code passed through the housing is connected to the circuit board, driving current is supplied to the light emission element via the connection code, and light is emitted from the light emission element in a predetermined direction.

In the door handle described in JP-A-2006-9279, however, the connection code is passed through the housing, and a load is applied to the circuit board, via the connection code, when the external force due to vibrations occurring during a vehicle travel acts on the connection code. As a result, the circuit board may deform or the connection state between the connection code and the circuit board may become unstable.

On the other hand, in a case where a dedicated support member for supporting the connection code is used in order to prevent the load from applying to the circuit board, the number of the members increases, which leads to the high manufacturing cost.

SUMMARY OF THE INVENTION

The invention provides a door handle that makes it possible to reduce the load applied to the circuit board while avoiding an increase in the manufacturing cost.

An aspect of the invention relates to A door handle including: a casing inside which an accommodation space is provided; and a lamp unit disposed in the accommodation space. The lamp unit includes a light emission element, a circuit board on which the light emission element is mounted, and a combination member including a housing and a light guiding lens. The housing supports the circuit board, and the light guiding lens guides light emitted from the light emission element in a predetermined direction. In the door handle, a connection code that supplies driving current to at least the light emission element is connected to the circuit board, and a portion of the connection code is wound around a portion of the combination member.

According to this configuration, the connection code is supported by the combination member with the connection code being wound around the combination member. Thus, when the external force acts on the connection code, the acting external force is less likely to be transmitted to the circuit board from the portion of the connection code wound around the combination member. As a result, it is possible to reduce the load applied to the circuit board while avoiding an increase in the manufacturing cost.

The portion of the connection code may be wound around the light guiding lens. Further, the housing may include a board mounting portion on which the circuit board is mounted, and the light guiding lens may protrude downward from the board mounting portion.

The door handle may further include an elastically deformable bushing fitted onto the connection code, and the bushing may be supported between the combination member and the casing. Further, the bushing may be clamped by a housing protrusion provided on the housing and a casing protrusion provided on the casing.

According to this configuration, the connection code is supported, via the bushing, by the combination member and the casing without providing a dedicated member for supporting the connection code.

A code insertion slit may be defined between the housing and the light guiding lens, the portion of the connection code may be passed through the code insertion slit and wound around the portion of the combination member, and a restriction protrusion that restricts a fall of the connection code in the code insertion slit may be provided on the combination member.

According to this configuration, the connection code contacts the restriction protrusion when the connection code is displaced in a direction in which the connection code in the code insertion slit falls off.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of a door handle according to the invention is explained with reference to the drawings.

Figure 1:
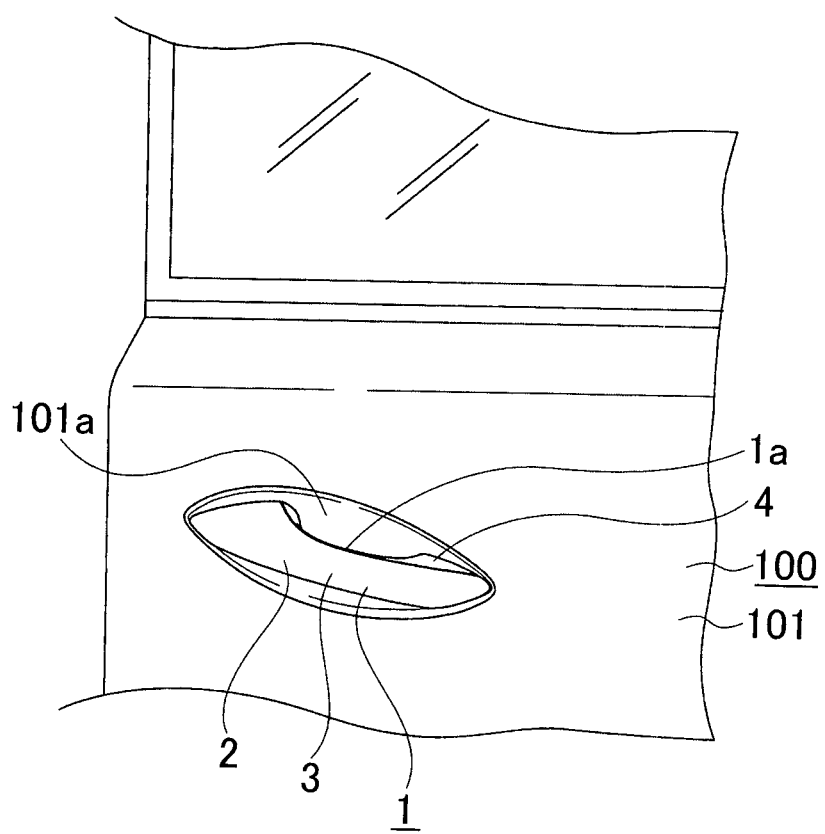
FIG. 1 shows an embodiment of the invention together with FIGS. 2 to 11, and is a schematic perspective view showing a door handle joined to a door.
Figure 2:
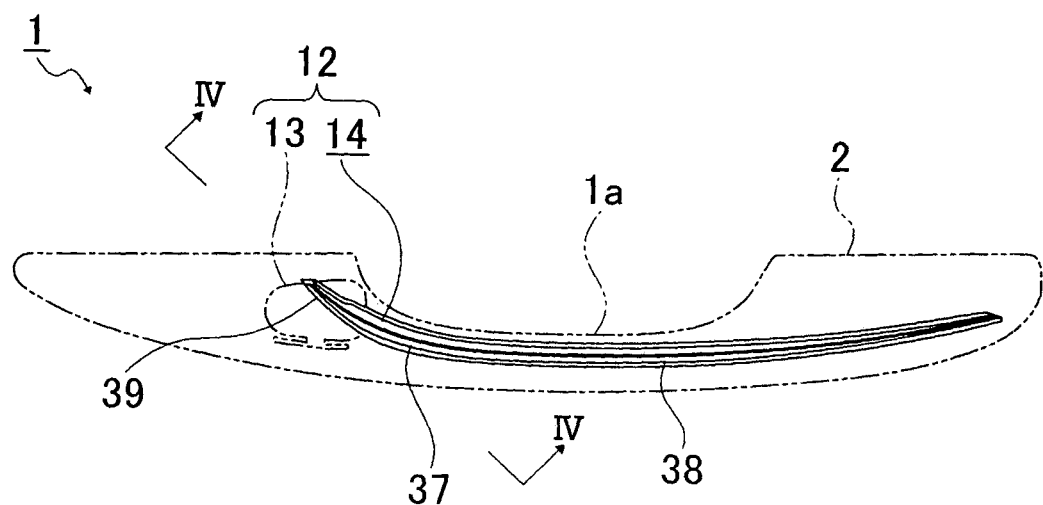
FIG. 2 is a schematic plan view of the door handle.
Figure 3:
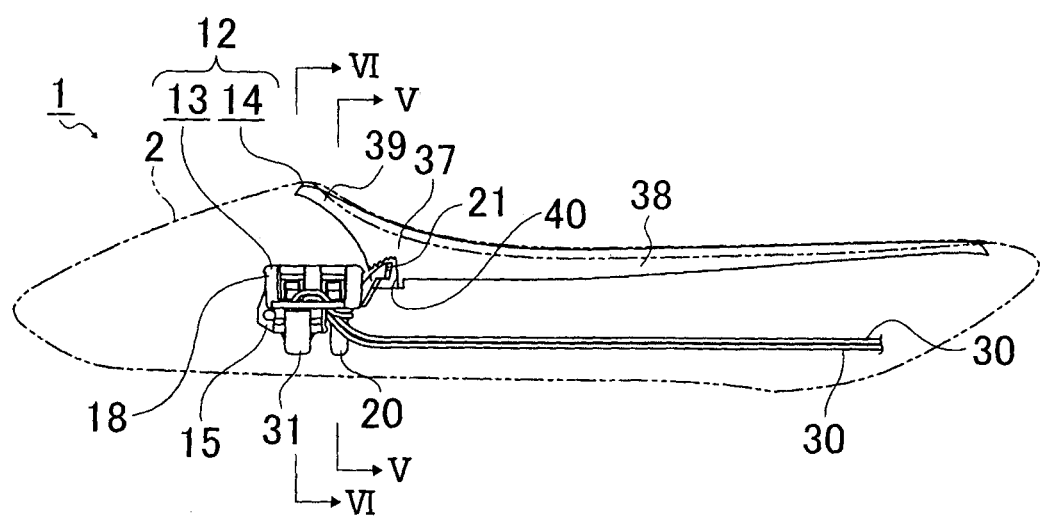
FIG. 3 is a schematic side view of the door handle.

A door handle 1 is used as a handle provided for a door 100 of a vehicle. The door handle 1 has a shape extending in a front-rear direction of the vehicle, for example, and includes a casing 2 and a lamp unit 12 disposed inside the casing 2, which will be described later (FIGS. 1 to 3). A joint portion of the door handle 1, which is provided at a front end portion thereof and not shown in the drawings, is joined to a door panel 101 (FIG. 1). A panel concavity 101a is formed in an outer surface of the door panel 101. The panel concavity 101a accommodates user's (occupant's) fingers put in an inner side of the door handle 1.

The door handle 1 pivots about the front end portion such that a rear end portion thereof moves in a right-left direction of the vehicle. When the door 100 is opened, the door handle 1 is caused to pivot by the user's operation in a direction in which the rear end portion moves away from the door panel 101. When the user's operation is completed, the door handle 1 is caused to pivot by an urging member, which is not shown in the drawings, in a direction in which the rear end portion moves closer to the door panel 101. Then, the door handle 1 returns to an initial position, which is a position of the door handle 1 before the use's operation.

In the vehicle including the door handle 1, when the user carrying a key for starting an engine of the vehicle approaches the door handle 1 to be within a certain distance from the vehicle, the key is detected by a detection unit (not shown in the drawings) provided in the door handle 1. At this time, the lamp unit 12 (described later) disposed inside the door handle 1 radiates light upon detection of the key. The lamp unit 12 radiates light toward a road surface at least below the door handle 1, and then a road surface around the use's feet is illuminated by the radiated light. Due to the radiated light, the user can see whether there is a puddle or the like when the door 100 is opened or closed during the night. Thus, the user-friendliness increases.

A concaved gripping portion 1a is provided in the door handle 1 except the front and rear end portions. The concaved gripping portion 1a is concaved outward, or in a direction away from the door panel 101 (FIGS. 1 and 2). The user (occupant) grips the concaved gripping portion 1a by putting the fingers in an inner side of the concaved gripping portion 1a to operate the door handle 1.

Figure 4:
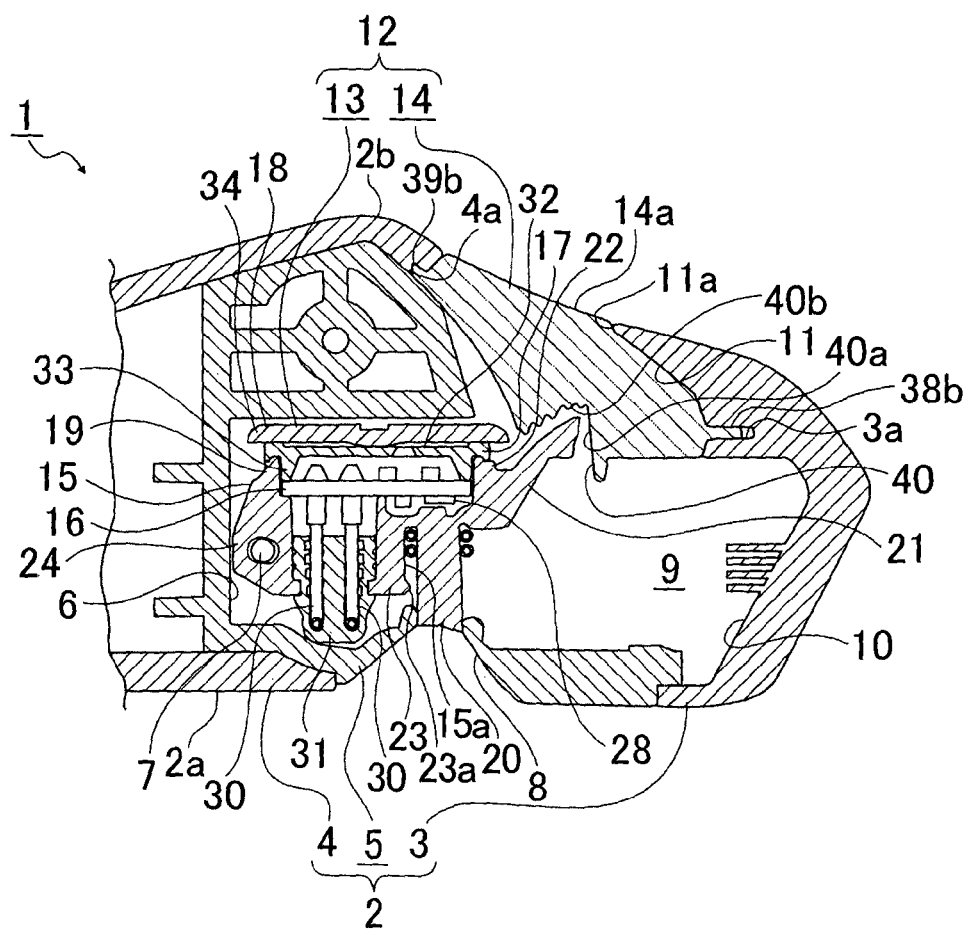
FIG. 4 is an enlarged cross-sectional view taken along a line IV-IV in FIG. 2.

The casing 2 includes a first panel 3, a second panel 4, and a inner panel 5 (FIG. 4). The first panel 3 and the second panel 4 are joined to each other in the right-left direction. The first panel 3 is positioned on the outer side and the second panel 4 is positioned on the inner side, i.e., on a side closer to the door panel 101.

In a state where the first panel 3 and the second panel 4 are joined to each other, the inner panel 5 is positioned inside both the panels 3 and 4, at least at a rear end side. An accommodation recess 6 opening generally frontward is provided in the inner panel 5. A positioning pin 7 extending in the generally right-left direction is provided on the inner panel 5 at a position close to a lower edge of the inner panel 5.

Figure 5:
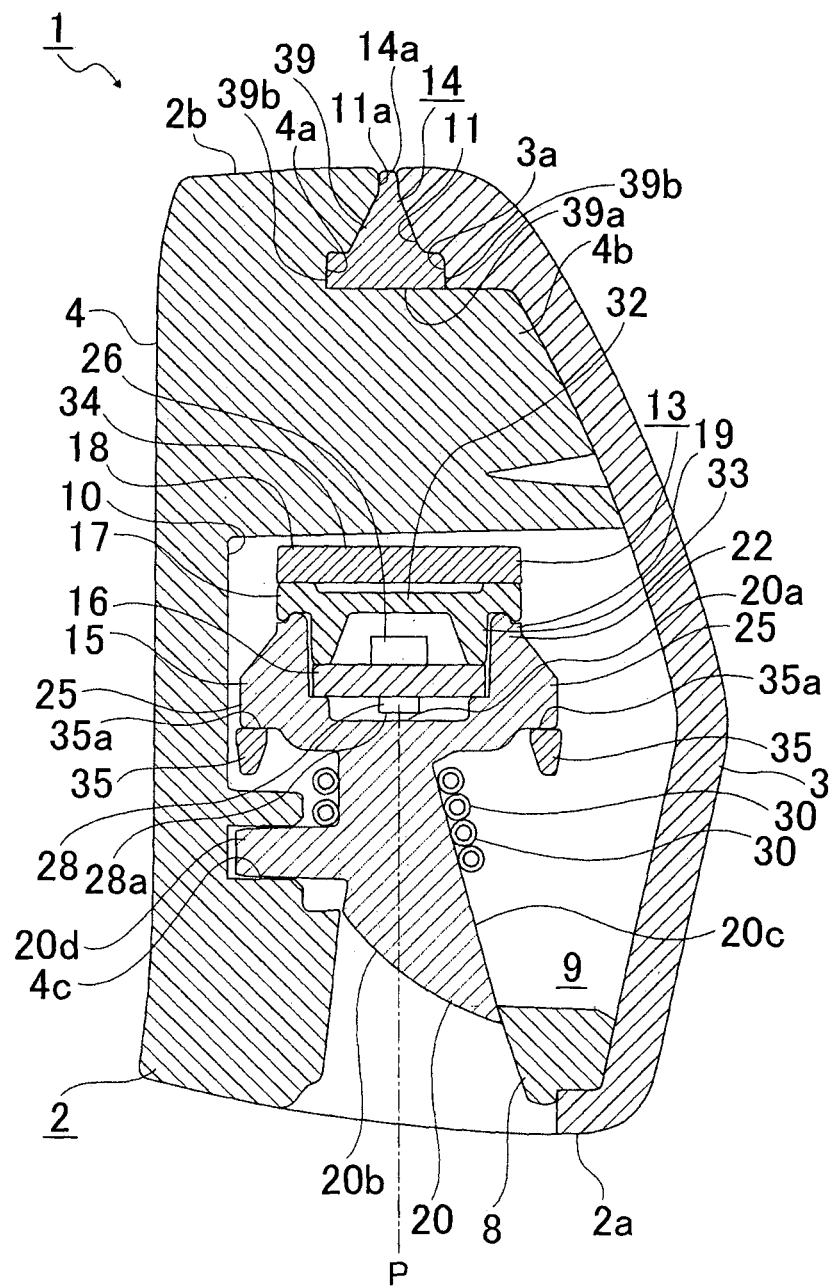
FIG. 5 is an enlarged cross-sectional view taken along a line V-V in FIG. 3.

An annular-shaped restriction wall portion 8 extending in an up-down direction of the vehicle is provided in a lower end portion of the casing 2. A space inside the restriction wall portion 8 communicates with an accommodation space 9 and a space below the door handle 1 (FIGS. 4 and 5). The restriction wall portion 8 is formed by a lower end portion of the second panel 4 and a lower end portion of the inner panel 5 connecting to each other in a circumferential direction of the restriction wall portion 8. The restriction wall portion 8 has a flared internal shape (i.e., a shape in which an internal diameter of the restriction wall portion 8 increases downward).

Inside the casing 2, the accommodation space 9 extending in the front-rear direction is defined between the first panel 3 and the second panel 4. The accommodation space 9 has a first space 10 and a second space 11. The first space 10 is positioned below the second space 11. The second space 11 opens upward and an opening 11a at the top is formed as a slit extending in the generally front-rear direction.

Figure 6:
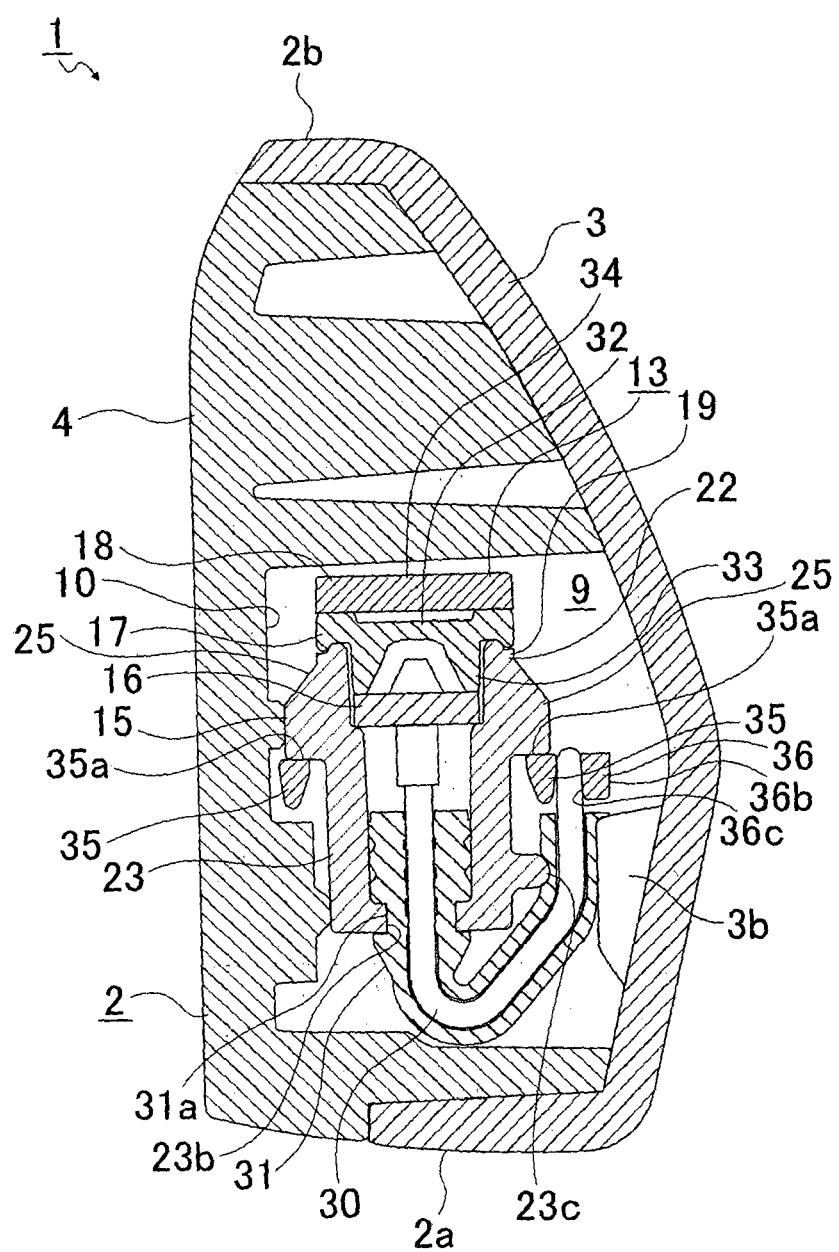
FIG. 6 is an enlarged cross-sectional view taken along a line VI-VI in FIG. 3.

A positioning recess 3a is provided in an inner surface of the first panel 3 except a rear end side portion thereof. The positioning recess 3a opens toward the second panel 4 and extends in the generally front-rear direction. A clamping protrusion 3b is provided in the inner surface of the first panel 3 at a position close to a lower edge in a rear end side (FIG. 6). The clamping protrusion 3b protrudes toward the second panel 4.

A positioning recess 4a is provided in an inner surface of the second panel 4 except a rear end side portion thereof. The positioning recess 4a opens toward at least the first panel 3 and extends in the generally front-rear direction. The positioning recess 4a faces the positioning recess 3a provided in the first panel 3.

A dividing protrusion 4b protruding toward the first panel 3 is provided in an intermediate portion of the second panel 4 in the up-down direction. The accommodation space 9 except a portion thereof is divided into the first space 10 and the second space 11 by the dividing protrusion 4b.

The positioning recess 4c opening toward the first panel 3 is provided in the second panel 4 at a position close to a lower edge thereof (FIG. 5).

The lamp unit 12 is disposed in the accommodation space 9 defined in the casing 2 (FIGS. 2 to 5). The lamp unit 12 includes a lamp member 13 and a light guide 14.

Figure 7:
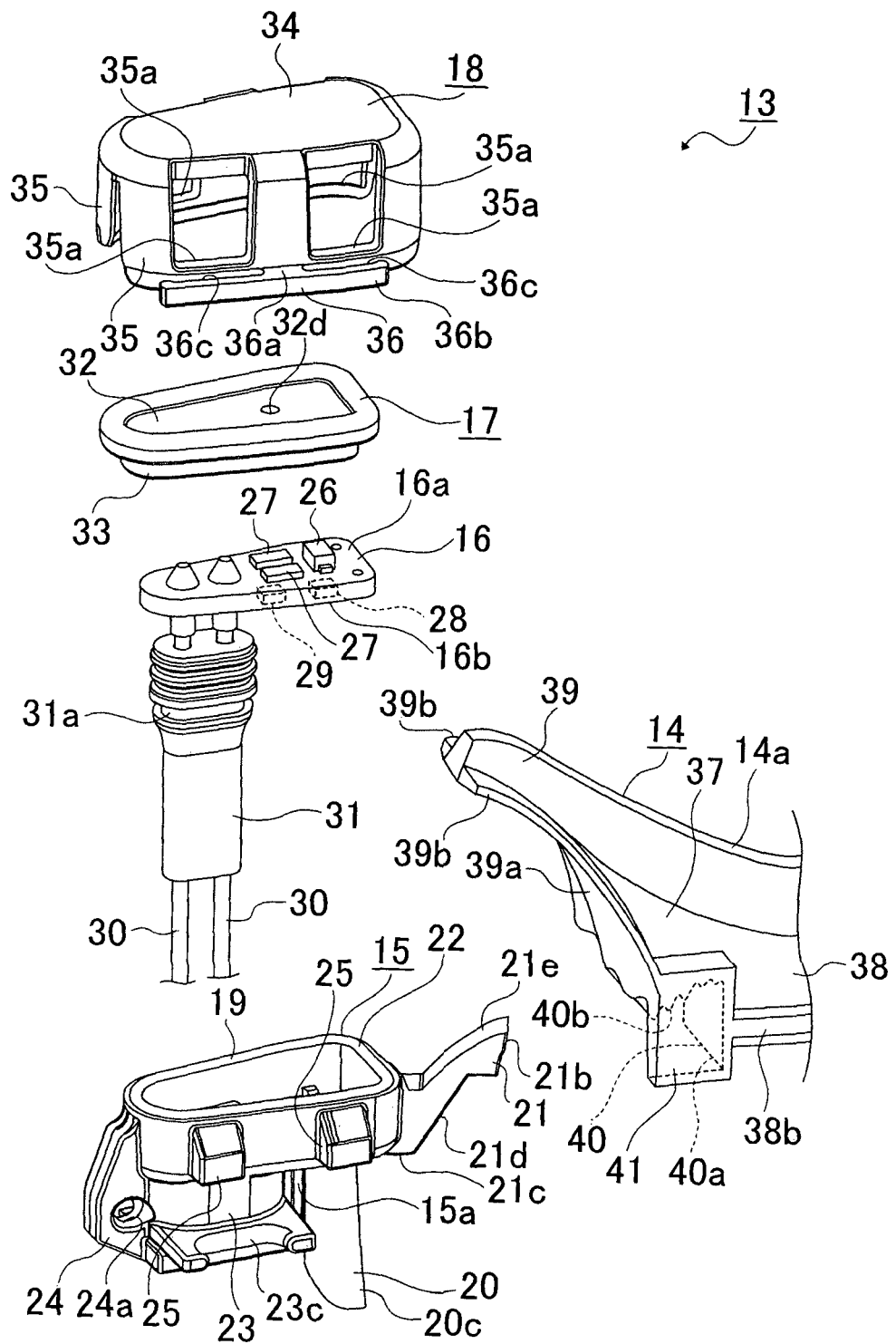
FIG. 7 is an enlarged exploded perspective view of a lamp member.

The lamp member 13 includes a combination member 15 made of a transparent material, a circuit board 16 supported by the combination member 15, a gasket 17 attached to the combination member 15, and a lid member 18 joined to the combination member 15 (FIGS. 4 and 7).

The combination member 15 includes a housing 19, a first light guiding lens 20, and a second light guiding lens 21. The housing 19, the first light guiding lens 20, and the second light guiding lens 21 are integrated as the combination member 15. The combination member 15 is disposed in the first space 10 of the accommodation space 9 with the housing 19 being attached to the casing 2 and at least a portion of the combination member 15 being disposed in the accommodation recess 6 of the inner panel 5.

The housing 19 includes a board mounting portion 22 having a box shape opening upward, a code passage portion 23 protruding downward from a rear end side portion of the board mounting portion 22, a positioning protrusion 24 protruding rearward from the board mounting portion 22 and the code passage portion 23, and joining protrusions 25 provided on right and left side surfaces of the board mounting portion 22.

An inner shape of the board mounting portion 22 is the same as an outer shape of the circuit board 16, and is slightly larger in size than the outer shape of the circuit board 16.

The code passage portion 23 has a tube shape extending in the up-down direction. A restriction protrusion 23a protruding forward is provided on an outer surface of a lower end portion of the code passage portion 23 (FIG. 4). An engagement protrusion 23b protruding inward is provided on an inner surface of the lower end portion of the code passage portion 23. A clamping protrusion 23c protruding in a lateral direction of the code passage portion 23 is provided on the code passage portion 23 at a position close to a lower edge (FIG. 6).

The positioning hole 24a is provided in the positioning protrusion 24. The positioning hole 24a extends through the positioning protrusion 24 in the right-left direction.

Two joining protrusions 25 are provided on each of the right and left side surfaces of the board mounting portion 22 (FIGS. 5 to 7). The two joining protrusions 25 on the same side surface of the board mounting portion 22 are spaced apart in the front-rear direction.

The first light guiding lens 20 protrudes downward from a front end side portion of the board mounting portion 22 (FIGS. 4 and 7). The first light guiding lens 20 is positioned in front of the code passage portion 23 with a space therebetween. The space between the first light guiding lens 20 and the code passage portion 23 is defined as the code insertion slit 15a.

The first light guiding lens 20 has a columnar shape extending in the up-down direction. The first light guiding lens 20 has a first incident surface 20a facing upward on an upper end thereof and a first emission surface 20b on a lower end thereof.

A positioning protrusion 20d protruding in a lateral direction of the first light guiding lens 20 is provided the first light guiding lens 20 in the at a position close to the lower end (FIG. 5).

The second light guiding lens 21 is positioned in front of the first light guiding lens 20 (FIGS. 4 and 7).

The second light guiding lens 21 has a second incident surface 21a at an upper surface of a lower end portion and a function surface 21b facing generally forward at an upper end portion. The function surface 21b functions as a second emission surface.

The second light guiding lens 21 has a first reflection surface 21c facing downward at the lower end portion, and a second reflection surface 21d that faces frontward and obliquely downward and is disposed between the first reflection surface 21c and the function surface 21b. The second light guiding lens 21 has a third reflection surface 21e that is continuous with the function surface 21b and faces rearward and obliquely upward. The third reflection surface 21e is positioned above the first reflection surface 21c. In each of the first reflection surface 21c, the second reflection surface 21d, and the third reflection surface 21e, light can be reflected by internal reflection.

As shown in FIGS. 4 and 5, the combination member 15 configured as described above is positioned with respect to the casing 2 by inserting the positioning pin 7 of the inner panel 5 in the positioning hole 24a provided in the positioning protrusion 24 of the housing 19 and inserting the positioning protrusion 20d of the first light guiding lens 20 in the positioning recess 4c provided in the second panel 4. Thus, the combination member 15 is disposed in the first space 10 of the accommodation space 9.

When the combination member 15 is positioned as described above and disposed in the first space 10 of the accommodation space 9, a lower end portion of the first light guiding lens 20 is fitted into an upper end portion of the restriction wall portion 8 of the casing 2.

The plate-shaped circuit board 16 has a surface (an upper surface 16a) facing upward and a surface (a lower surface 16b) facing downward (FIGS. 4 to 7). The circuit board 16 is a double-sided circuit board. A diode 26 having a rectifying function and resistors 27 having a function to restrict current are mounted on a front half portion of the upper surface 16a of the circuit board 16. A light emission element 28 functioning as a light source that emits light, and a capacitor 29 having a function to store electricity and a discharge function are mounted on a front half portion of the lower surface 16b of the circuit board 16. The light emission element 28 is positioned in front of the capacitor 29.

A light emitting diode (LED) is used as the light emission element 28, for example. The light emission element 28 is disposed such that a light emission surface 28a thereof faces downward.

Connection codes 30 supply driving current to the light emission element 28 and the like. One end of each connection code 30 is connected to a rear half portion of the circuit board 16 from below by, for example, soldering. The connection codes 30 pass through the first space 10 of the accommodation space 9, and, via a front end portion of the casing 2, pass through the inside of the door 100. The other end of each connection code 30 is connected to a power supply circuit, which is not shown in the drawings.

A bushing 31 is fitted onto a portion of the connection codes 30 near the one end, and protects the connection codes 30 (FIGS. 4, 6, and 7). The bushing 31 is an elastically deformable member made of, for example, a rubber material. An engagement recess 31a extending in a circumferential direction is provided on an outer periphery portion of the bushing 31.

The circuit board 16 is inserted in the board mounting portion 22 from above the housing 19 with the connection codes 30 being connected to the circuit board 16, and then disposed in the board mounting portion 22 (FIGS. 4 to 6).

At this time, the connection codes 30 and the bushing 31 protecting the connection codes 30 are inserted in the code passage portion 23 from above, and the engagement protrusion 23b of the code passage portion 23 is engaged with the engagement recess 31a of the bushing 3. Thus, the connection codes 30 and the bushing 31 are attached to the housing 19 (FIGS. 4 and 6). One end portion of the bushing 31 is fitted into the code passage portion 23 with a portion thereof being elastically deformed, and thus displacement of the connection codes 30 and the bushing 31 with respect to the code passage portion 23 is restricted.

The connection codes 30 and the bushing 31 bend so as to fold upward at a generally intermediate portion of the bushing 31 in a longitudinal direction. The other end portion of the bushing 31 is clamped from the both sides in the right-left direction, by a clamping protrusion 23c provided on the code passage portion 23 and the clamping protrusion 3b provided on the first panel 3 (FIG. 6).

Accordingly, a dedicated member for supporting the connection codes 30 is not required, the connection codes 30 can be stably supported without increasing the number of the members, and a load transmission from the connection codes 30 to the circuit board 16 is reduced.

Figure 8:
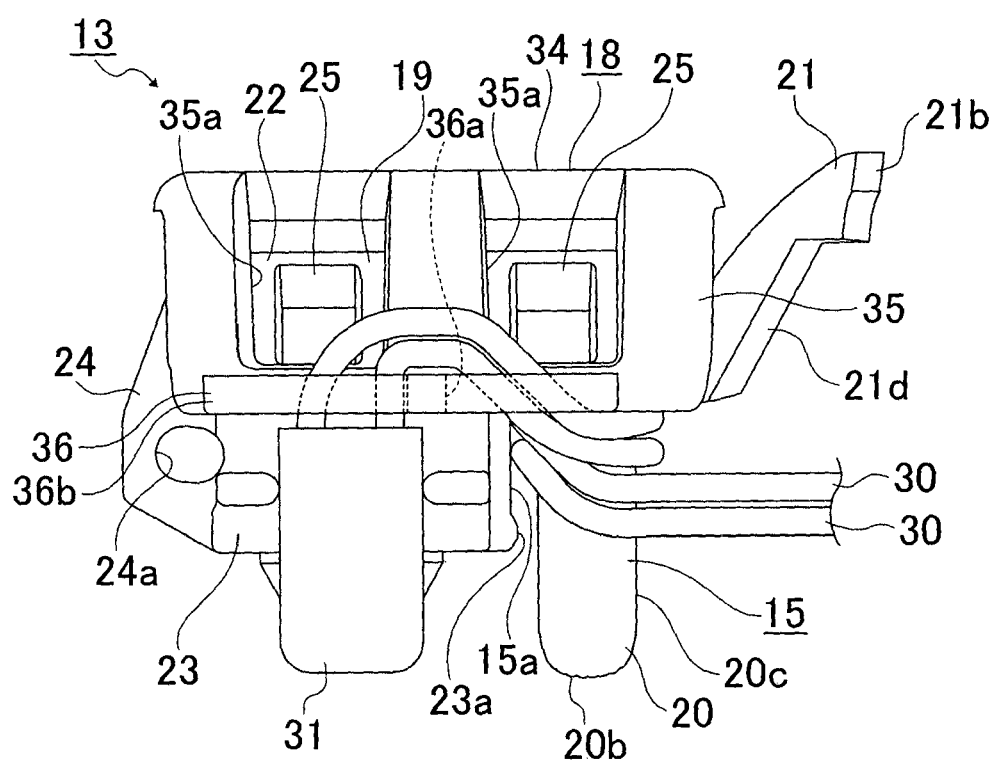
FIG. 8 is an enlarged side view of the lamp member.
Figure 9:
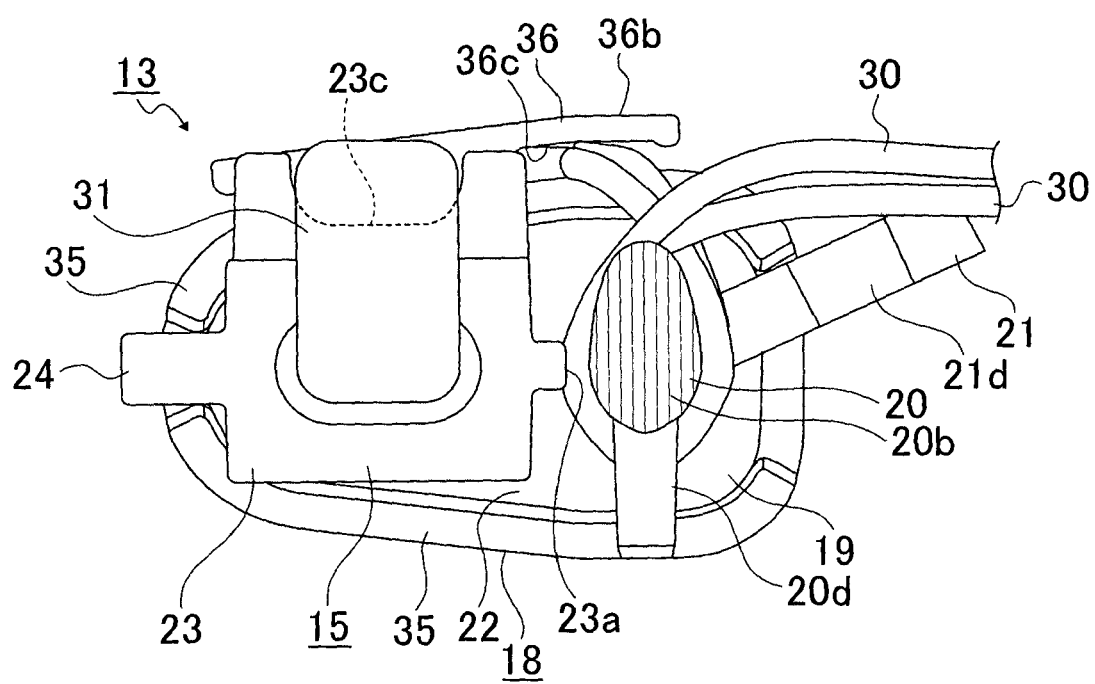
FIG. 9 is an enlarged bottom view of the lamp member.

A portion of the connection codes 30, unprotected by the bushing 31 (i.e., exposed from the bushing 31), is passed through the code insertion slit 15a defined between the first light guiding lens 20 and the code passage portion 23, and is wound around the first light guiding lens 20 (FIGS. 8 and 9). The portion of the connection codes 30 may be wound around a portion of the combination member 15 other than the first light guiding lens 20.

As described above, a portion of the connection codes 30 are supported by the combination member 15 with the connection codes 30 being wound around the first light guiding lens 20. Thus, when the external force acts on the connection codes 30 due to vibrations occurring during a vehicle travel, the acting external force is less likely to be transmitted to the circuit board 16 from the connection codes 30. In addition, the connection codes 30 can be supported without using the dedicated support member for supporting the connection codes 30 by winding the connection codes 30 around the portion of the combination member 15. As a result, the load applied to the circuit board 16 can be reduced while avoiding an increase in the manufacturing cost.

Further, the connection codes 30 are stably supported by winding the portion of the combination member 15, and thus breaking of the connection codes 30 can be prevented.

Further, the connection codes 30 are supported in a small area by winding the connection codes 30 around the portion of the combination member 15, and thus a space-saving and compact door handle 1 can be realized.

The restriction protrusion 23a protruding toward the first light guiding lens 20 is provided at the lower end portion of the code passage portion 23, and thus the connection codes 30 can be prevented from falling off the combination member 15 without increasing the number of the members.

In the above embodiment, the restriction protrusion 23a is provided at the lower end portion of the code passage portion 23. However, a restriction protrusion protruding toward the code passage portion 23 may be provided on the first light guiding lens 20, or restriction protrusions may be provided on the code passage portion 23 and the first light guiding lens 20, respectively.

As described above, the gasket 17 is attached to the circuit board 16 in a state where the circuit board 16 is disposed in the board mounting portion 22 (FIGS. 4 to 7).

The gasket 17 is attached to the housing 19 with a closing surface portion 32 thereof closing the opening of the board mounting portion 22 (FIGS. 4 to 6), and protects the circuit board 16 disposed in the board mounting portion 22 against water.

As described above, the lid member 18 is joined to the housing 19 in a state where the gasket 17 is attached to the board mounting portion 22. The lid member 18 includes a generally plate-shaped covering surface portion 34 facing the up-down direction, side surface portions 35 respectively extending downward from both sides of the covering surface portion 34 in the right-left direction, a code holding portion 36 provided to be continuous with a lower end portion of one of the side surface portions 35 (FIGS. 4 to 7).

An outer shape of the covering surface portion 34 is the same as an outer shape of the closing surface portion 32 of the gasket 17, and has substantially the same size as the size of the outer shape of the closing surface portion 32.

Joining holes 35a extending through the side surface portions 35 in the right-left direction are provided in the side surface portions 35. Two joining holes 35a are provided in each side surface portion 35. The two joining holes 35a in the same side surface portion 35 are spaced apart in the front-rear direction.

The code holding portion 36 has a connecting portion 36a that extends in the lateral direction (outward) from one of the side surface portions 35, and a holder 36b that is connected to the connecting portion 36a and extends in the front-rear direction. Code holding spaces 36c each extending in the front-rear direction are defined between the holder 36b and the side surface portion 35. The code holding spaces 36c are spaced apart in the front-rear direction.

The joining protrusions 25 are engaged with lower edges defining the joining holes 35a provided in the side surface portions 35, and thus the lid member 18 is joined to the housing 19 (FIGS. 4 to 6).

When the lid member 18 is joined to the housing 19, a portion of each connection code 30 between the bushing 31 and the portion wound around the first light guiding lens 20 is inserted in the corresponding code holding space 36c defined between the holder 36b of the housing 19 and the board mounting portion 22, and then held by the code holding portion 36. Accordingly, the connection codes 30 can be supported more stably.

The light guide 14 as a whole has a shape extending in the generally front-rear direction. A rear end portion of the light guide 14 is disposed above the lamp member 13, and the light guide 14 except the rear end portion is disposed in front of the lamp member 13 (FIGS. 2 and 3).

The light guide 14 is made of the transparent material. The light guide 14 has a wide width portion 37 having the widest width in the up-down direction, an extending portion 38 extending in the generally front-rear direction, and a slant portion 39 extending rearward and obliquely from the wide width portion 37. The wide width portion 37 is positioned close to a rear end of the light guide 14, the extending portion 38 is positioned in front of the wide width portion 37, and the slant portion 39 is positioned behind the wide width portion 37.

A notch 40 opening rearward and generally downward is provided in a lower end portion of the wide width portion 37 (FIG. 4). A rear surface of the wide width portion 37, which defines the notch 40, is formed as a first light entrance surface 40a, and a lower surface of the wide width portion 37, which defines the notch 40, is formed as a second light entrance surface 40b. The second light entrance surface 40b has a stepped shape.

The extending portion 38 has a tapered shape tapering forward (FIG. 3). A lower surface of the extending portion 38 is formed as an internal reflection surface 38a subjected to surface texturing. Positioning elongated protrusions 38b protruding in the lateral direction are provided on the extending portion 38 on an intermediate portion in the up-down direction (FIG. 7).

The slant portion 39 has a tapered shape tapering rearward (FIGS. 3 and 5). A rear surface (a surface facing obliquely downward) of the slant portion 39 is formed as an internal reflection surface 39a subjected to surface texturing. Positioning elongated protrusions 39b protruding in the lateral direction are provided on the slant portion 39 at a lower end portion (FIGS. 5 and 7).

An upper end portion of the light guide 14 is also subjected to surface texturing. An upper surface of the light guide 14 is formed as a light output surface 14a.

In the light guide 14, a cover portion 41 is provided at the lower end portion of the wide width portion 37 (FIG. 7). The cover portion 41 is provided at a side of the first light entrance surface 40a and the second light entrance surface 40b such that the cover portion 41 faces in the right-left direction.

The light guide 14 is positioned with respect to the casing 2 by inserting the positioning elongated protrusion 38b and the positioning elongated protrusion 39b in the positioning recess 3a provided in the first panel 3 and inserting the positioning elongated protrusion 38b and the positioning elongated protrusion 39b in the positioning recess 4a provided in the second panel 4, respectively (FIGS. 4 and 5). Thus, the light guide 14 is disposed in the first space 10 of the accommodation space 9.

When the light guide 14 is disposed in the first space 10 of the accommodation space 9 as described above, a tip end portion of the second light guiding lens 21 of the lamp member 13 is positioned inside the notch 40 of the light guide 14 (FIG. 4). In the light guide 14, the first light entrance surface 40a faces the function surface 21b of the second light guiding lens 21, and the second light entrance surface 40b faces the third reflection surface 21e of the second light guiding lens 21.

When the light guide 14 is disposed in the first space 10 as described above, the tip end portion of the second light guiding lens 21 of the combination member 15 is covered by the cover portion 41.

Figure 10:
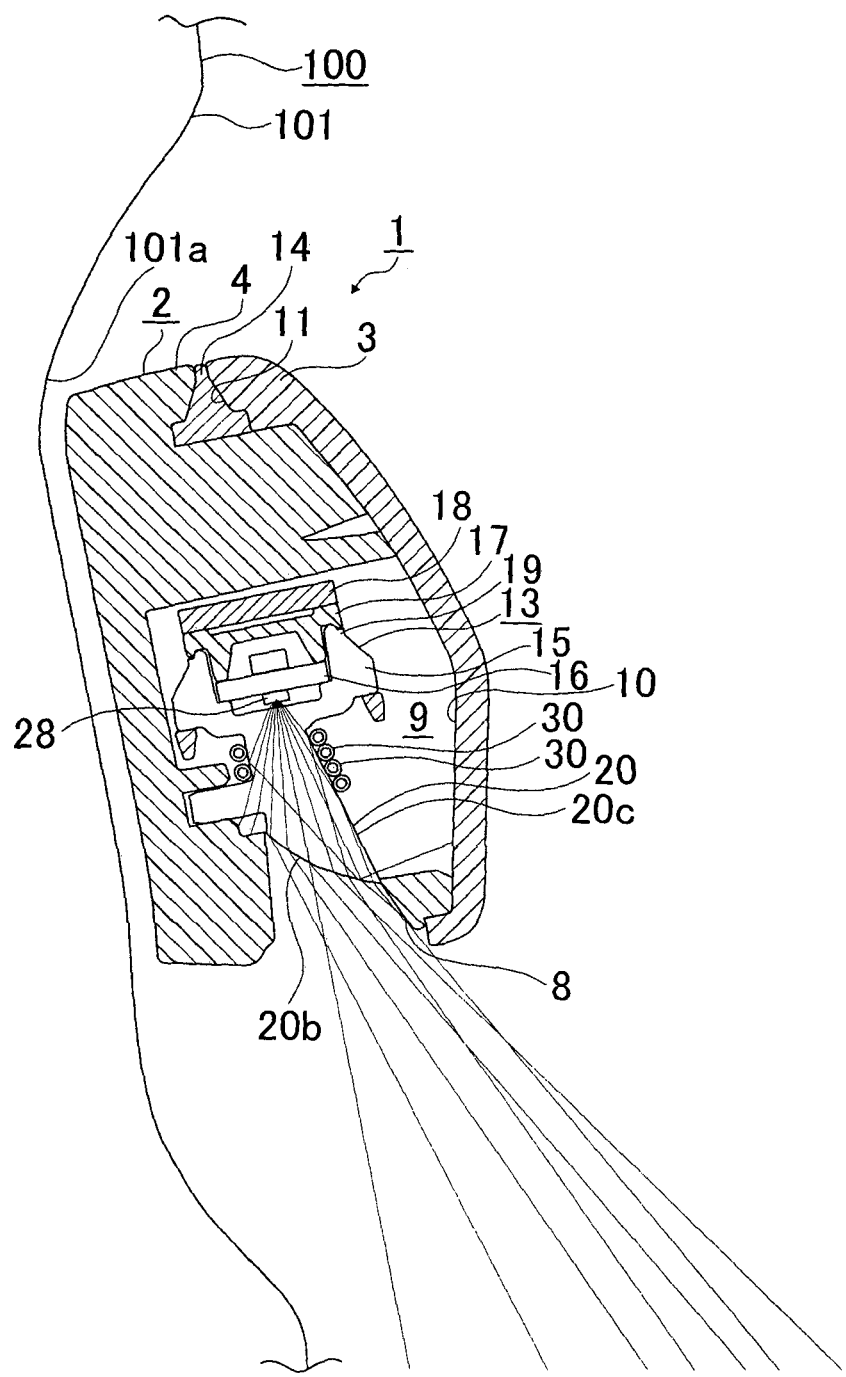
FIG. 10 is an enlarged view showing paths of light emitted from a first light guiding lens.
Figure 11:
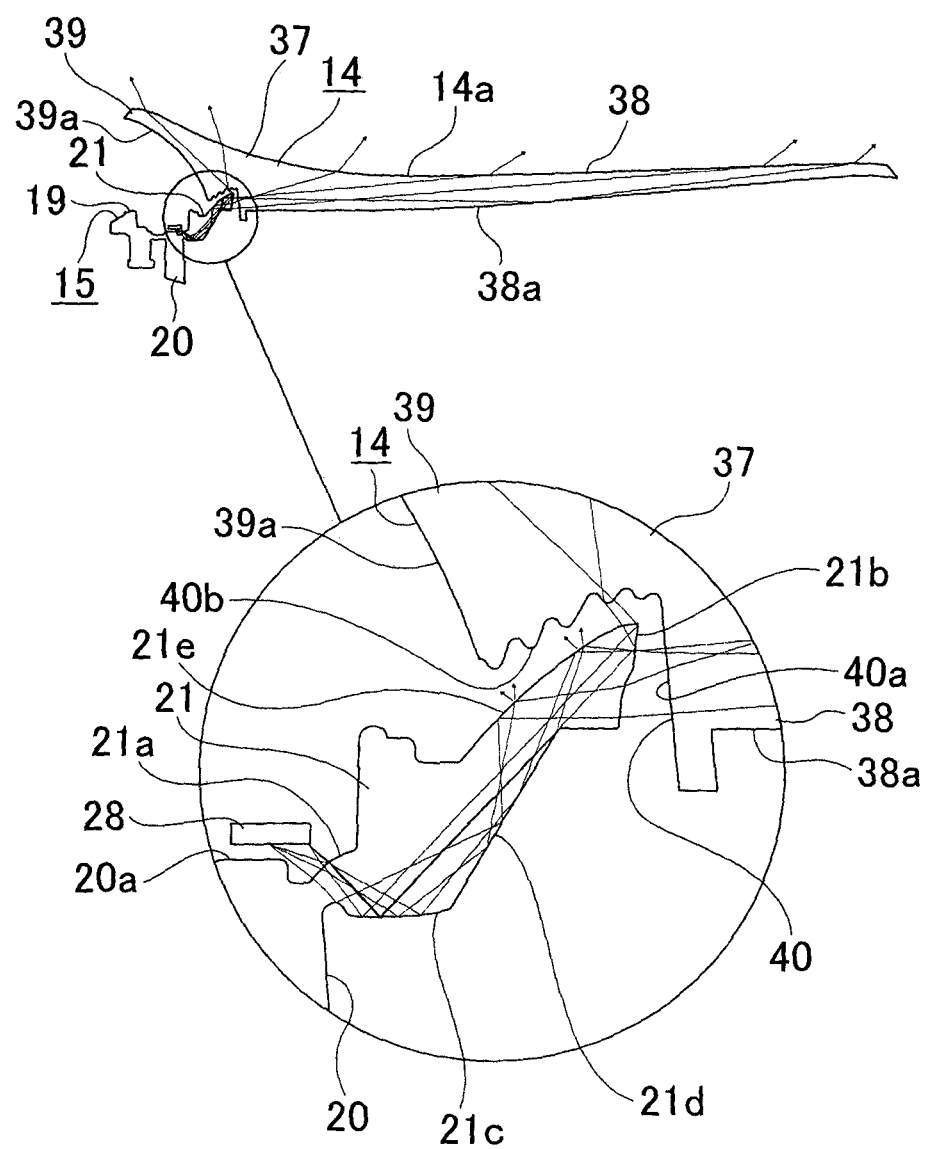
FIG. 11 is an enlarged view showing paths of light output from a light guide via a second light guiding lens.

Hereinafter, the state of light emission from the lamp member 13 and the light guide 14 will be explained (FIGS. 10 and 11).

When light is emitted from the light emission surface 28a of the light emission element 28 mounted on the circuit board 16, as shown in FIG. 10, after the light emitted downward enters the first light guiding lens 20 through the first incident surface 20a, a portion of the entering light is internally reflected by an inner surface of the first light guiding lens 20 and then guided by the first light guiding lens 20 toward the first emission surface 20b.

The light guided by the first light guiding lens 20 is emitted downward from the first emission surface 20b. The light emitted from the first emission surface 20b is refracted by the first emission surface 20b. At this time, since the first emission surface 20b is slanted downward as the distance in the right-left direction from the vehicle increases, and slanted with respect to the light axis P, the light emitted from the first emission surface 20b is refracted in a direction away from the door panel 101 of the vehicle, and then a road below at a side of the door panel 101 is illuminated with the emitted light.

On the other hand, when light is emitted from the light emission surface 28a of the light emission element 28 mounted on the circuit board 16, a portion of the light emitted obliquely enters the second light guiding lens 21 through the second incident surface 21a, and the entering light travels toward the first reflection surface 21c (FIG. 11). The light A and B traveling toward the first reflection surface 21c is internally reflected by the first reflection surface 21c, and then travels toward the second reflection surface 21d or the function surface 21b.

The light A traveling toward the second reflection surface 21d is internally reflected by the second reflection surface 21d, and subsequently enters the third reflection surface 21e. The light A in the third reflection surface 21e, except a portion thereof, travels toward the function surface 21b, and after emitted from the function surface 21b, enters the light guide 14 through the first light entrance surface 40a. The portion of the light A, which has been internally reflected by the second reflection surface 21d and entered the third reflection surface 21e, is emitted from the third reflection surface 21e as leaked light, and then enters the light guide 14 through the second light entrance surface 40b.

On the other hand, the light B, which has been internally reflected by the first reflection surface 21c and traveled toward the function surface 21b, enters the third reflection surface 21e after internally reflected by the function surface 21b. The light B in the third reflection surface 21e is emitted from the third reflection surface 21e and then enters the light guide 14 through the second light entrance surface 40b.

The light having entered into the light guide 14 through the first light entrance surface 40a is guided through the extending portion 38 and emitted from the light output surface 14a. The light having entered the light guide 14 from the second light entrance surface 40b is guided through the wide width portion 37 or the slant portion 39 and emitted from the light output surface 14a.

A portion of the light, which is guided through the light guide 14 and reaches the internal reflection surface 39a or the internal reflection surface 38a, is internally reflected by the internal reflection surface 39a or the internal reflection surface 38a, and then guided to the light output surface 14a. The upper end portion of the light guide 14 is subjected to surface texturing. The light is also internally reflected by the portion subjected to the surface texturing and guided to the light output surface 14a.

As described above, the light having entered the light guide 14 is guided through the wide width portion 37, the slant portion 39, or the extending portion 38 and then emitted from the light output surface 14a. As a result, the whole light output surface 14a appears luminous.

The invention claimed is:

1. A door handle comprising:
   a casing inside which an accommodation space is provided; and
   a lamp unit disposed in the accommodation space, wherein:
   the lamp unit includes a light emission element, a circuit board on which the light emission element is mounted, and a combination member including a housing and a light guiding lens;
   the housing supports the circuit board, and the light guiding lens guides light emitted from the light emission element in a predetermined direction;
   a connection wire that supplies driving current to at least the light emission element is connected to the circuit hoard, and a portion of the connection wire is wound around a portion of the combination member; and
   wherein the portion of the connection wire is wound around the light guiding lens.

2. The door handle according to claim 1, wherein:
   the housing includes a board mounting portion on which the circuit board is mounted; and
   the light guiding lens protrudes downward from the board mounting portion.

3. A door handle comprising:
   a casing inside which an accommodation space is provided;
   a lamp unit disposed in the accommodation space, wherein:
   the lamp unit includes a light emission element, a circuit board on which the light emission element is mounted, and a combination member including a housing and a light guiding lens;
   the housing supports the circuit board, and the light guiding lens guides light emitted front the light emission element in a predetermined direction; and
   a connection wire that supplies driving current to at least the light emission element is connected to the circuit board, and a portion of the connection wire is wound around a portion of the combination member; and
   an elastically deformable bushing fitted onto the connection wire, wherein
   the bushing is supported between the combination member and the casing.

4. The door handle according to claim 3, wherein the bushing is clamped by a housing protrusion provided on the housing and a casing protrusion provided on the casing.

5. A door handle comprising:
a casing inside which an accommodation space is provided; and
a lamp unit disposed in the accommodation space, wherein:
the lamp unit includes a light emission element, a circuit board on which the light emission element is mounted, and a combination member including a housing and a light guiding lens;
the housing supports the circuit board, and the light guiding lens guides light emitted from the light emission element in a predetermined direction;
a connection wire that supplies driving current to at least the light emission element is connected to the circuit board, and a portion of the connection wire is wound around a portion of the combination member;
a wire insertion slit is defined between the housing and the light guiding lens;
the portion of the connection wire is passed through the wire insertion slit and wound around the portion of the combination member; and
a restriction protrusion that restricts a fall of the connection wire in the wire insertion slit is provided on the combination member.

* * * * *